(12) United States Patent
Yakuel et al.

(10) Patent No.: US 9,709,075 B2
(45) Date of Patent: Jul. 18, 2017

(54) SABBATH ELEVATOR

(75) Inventors: Arie Yakuel, Jerusalem (IL); Hilel Yakovson, Beit Shemesh (IL); Dvir Brand, Kfar Saba (IL)

(73) Assignees: Arie Yakuel, Jerusalem (IL); Hilel Yakovson, Beit Shemesh (IL)

( * ) Notice: Subject to any disclaimer, the term of this patent is extended or adjusted under 35 U.S.C. 154(b) by 473 days.

(21) Appl. No.: 14/238,476

(22) PCT Filed: Sep. 6, 2012

(86) PCT No.: PCT/IB2012/054604
§ 371 (c)(1),
(2), (4) Date: Feb. 12, 2014

(87) PCT Pub. No.: WO2013/035060
PCT Pub. Date: Mar. 14, 2013

(65) Prior Publication Data
US 2014/0174860 A1      Jun. 26, 2014

Related U.S. Application Data

(60) Provisional application No. 61/533,244, filed on Sep. 11, 2011.

(51) Int. Cl.
| B66B 11/04 | (2006.01) |
| F15B 1/02 | (2006.01) |
| B66B 17/12 | (2006.01) |
| B66B 9/04 | (2006.01) |

(52) U.S. Cl.
CPC ............. *F15B 1/024* (2013.01); *B66B 9/04* (2013.01); *B66B 11/04* (2013.01); *B66B 17/12* (2013.01); *Y02B 50/127* (2013.01); *Y02B 50/146* (2013.01); *Y02B 50/148* (2013.01)

(58) Field of Classification Search
CPC .................................. B66B 9/04; B66B 11/04
See application file for complete search history.

(56) References Cited

U.S. PATENT DOCUMENTS

| 2004/0035646 A1* | 2/2004 | Araki | B66B 5/027 187/290 |
| 2007/0256898 A1* | 11/2007 | Lee | B66B 9/04 187/275 |
| 2011/0100758 A1* | 5/2011 | Zweig | B66B 1/468 187/247 |
| 2013/0126277 A1* | 5/2013 | Friedman | B66B 3/00 187/384 |
| 2014/0364272 A1* | 12/2014 | Shapira | B60W 10/08 477/3 |

\* cited by examiner

*Primary Examiner* — William E Dondero
*Assistant Examiner* — Diem Tran
(74) *Attorney, Agent, or Firm* — Mark M. Friedman (57) ABSTRACT

A drive system provides a displacement mechanism for driving motion of a device using energy stored in an energy accumulator in a non-electric form. A charge/discharge arrangement selectively charges the energy accumulator with energy derived from an energy source while isolated from the displacement mechanism, and the connects the energy accumulator to the displacement mechanism to provide energy for driving motion of the device. The energy accumulator may be hydraulic, pneumatic or gravitational. Examples of devices driven by the system include elevators, escalators and vehicles.

19 Claims, 10 Drawing Sheets

SABBATH ELEVATOR

FIELD AND BACKGROUND OF THE INVENTION

The present invention relates to a modified drive system for an elevator ameliorating certain concerns associated with use of Sabbath elevators by religiously observant Jews.

It is known to provide an automated elevator which performs a pre-programmed cycle of traveling between different floors of a building in order to allow Sabbath-observant Jews to use the elevator without needing to actuate any controls. Such elevators have achieved limited acceptance in the religious community due to a number of concerns. A full discussion of those concerns is beyond the scope of this document. However, one such concern relates to the possibility that the weight of a person riding in the elevator may cause the electric motor driving the elevator to draw additional electrical current.

There is therefore a need for a Sabbath elevator with a drive system configured to avoid changes in electrical current due to the weight of a person using the elevator.

SUMMARY OF THE INVENTION

The present invention is a Sabbath elevator and corresponding drive system and method in which an electric motor or other power source is used to store potential energy in a non-electric form, which is then used to drive the elevator.

According to certain embodiments, energy is stored in an energy accumulator, for example, in which potential energy is stored by compression of a gas and/or spring. According to certain alternative embodiments, gravitational energy is stored by elevation of a weight. In the latter category, the gravitational energy may be used as an accumulator for actuating bidirectional motion, or may be transferred alternately between an elevator compartment and a counterweight in order to alternately bias the system for motion in one direction.

Each of the above options may be implemented using either mechanical arrangements, pneumatic arrangements or hydraulic (liquid-based) arrangements.

In particularly preferred embodiments, the quantity of stored energy dissipated over a given range of movement of the elevator is predefined and independent of the load within the elevator compartment (up to the appropriate permitted loading limit). Excess energy not required for the motion is typically dissipated in a controlled manner, for example as heat, but without causing greatly raised temperatures.

Thus, according to the teachings of certain embodiments of the present invention, there is provided a Sabbath elevator drive system for driving motion of an elevator compartment based on energy from an energy source, the drive system comprising: (a) a displacement mechanism mechanically associated with the elevator compartment for moving the elevator compartment between floors; (b) an energy accumulator configured to store a quantity of potential energy in a non-electric form; and (c) a charge/discharge arrangement associated with the energy accumulator, the displacement mechanism and the energy source, the charge/discharge arrangement being configured to selectively assume: (i) a first state in which the energy accumulator charges with energy derived from the energy source so as to store a quantity of energy while being isolated from the displacement mechanism, and (ii) a second state in which the energy accumulator is isolated from the energy source and connected to the displacement mechanism to provide energy for moving the elevator compartment between floors.

According to a further feature of certain preferred implementations of the present invention, the energy accumulator is a first accumulator of an accumulator arrangement further comprising at least a second energy accumulator, and wherein the charge/discharge arrangement is configured to charge the second energy accumulator while the first energy accumulator is connected to the displacement mechanism, and subsequently to connect the second energy accumulator to the displacement mechanism.

According to a further feature of certain preferred implementations of the present invention, the energy accumulator is a hydraulic accumulator.

According to a further feature of certain preferred implementations of the present invention, the displacement mechanism comprises a hydraulic cylinder.

According to a further feature of certain preferred implementations of the present invention, the displacement mechanism further comprises a motion-multiplying arrangement linking the hydraulic cylinder to the elevator compartment and configured such that a given change in an extent of extension of the hydraulic cylinder generates a corresponding displacement of the elevator compartment greater than the given change.

According to a further feature of certain preferred implementations of the present invention, the displacement mechanism further comprises a linkage configured to raise the elevator compartment on shortening of the hydraulic cylinder.

According to a further feature of certain preferred implementations of the present invention, the charge/discharge arrangement comprises a hydraulic pump configured to raise a pressure within the hydraulic accumulator to a charged pressure of at least 60 bar.

According to a further feature of certain preferred implementations of the present invention, the displacement mechanism comprises a pressure-compensated flow regulator deployed to render a speed of motion of the elevator compartment substantially independent of a load within the elevator compartment.

According to a further feature of certain preferred implementations of the present invention, the displacement mechanism comprises a hydraulic motor.

According to a further feature of certain preferred implementations of the present invention, energy accumulator is a pneumatic accumulator.

According to a further feature of certain preferred implementations of the present invention, the energy accumulator stores energy by raising a mass against the force of gravity.

According to a further feature of certain preferred implementations of the present invention, the mass is a quantity of liquid and wherein the charge/discharge arrangement includes a pump.

According to a further feature of certain preferred implementations of the present invention, the mass is a length of chain and wherein the charge/discharge arrangement includes a chain drive.

According to a further feature of certain preferred implementations of the present invention, the charge/discharge transfers at least part of the mass directly between the elevator compartment and a counterweight assembly.

There is also provided according to certain preferred embodiments of the present invention, a drive system for driving motion of a device based on energy from an energy source, the drive system comprising: (a) a displacement mechanism mechanically associated with the device for driving motion of the device; (b) an energy accumulator configured to store a quantity of potential energy in a non-electric form; and (c) a charge/discharge arrangement associated with the energy accumulator, the displacement mechanism and the energy source, the charge/discharge arrangement being configured to selectively assume: (i) a first state in which the energy accumulator charges with energy derived from the energy source so as to store a quantity of energy while being isolated from the displacement mechanism, and (ii) a second state in which the energy accumulator is isolated from the energy source and connected to the displacement mechanism to provide energy for driving motion of the device.

According to a further feature of certain preferred implementations of the present invention, the drive system is incorporated into an elevator system.

According to a further feature of certain preferred implementations of the present invention, the drive system is incorporated into an escalator.

According to a further feature of certain preferred implementations of the present invention, the drive system is incorporated into a vehicle.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a Sabbath elevator and corresponding drive system and method in which an electric motor is used to store potential energy in a non-electric form, which is then used to drive the elevator.

The principles and operation of Sabbath elevators according to the present invention may be better understood with reference to the drawings and the accompanying description.

Figure 1:
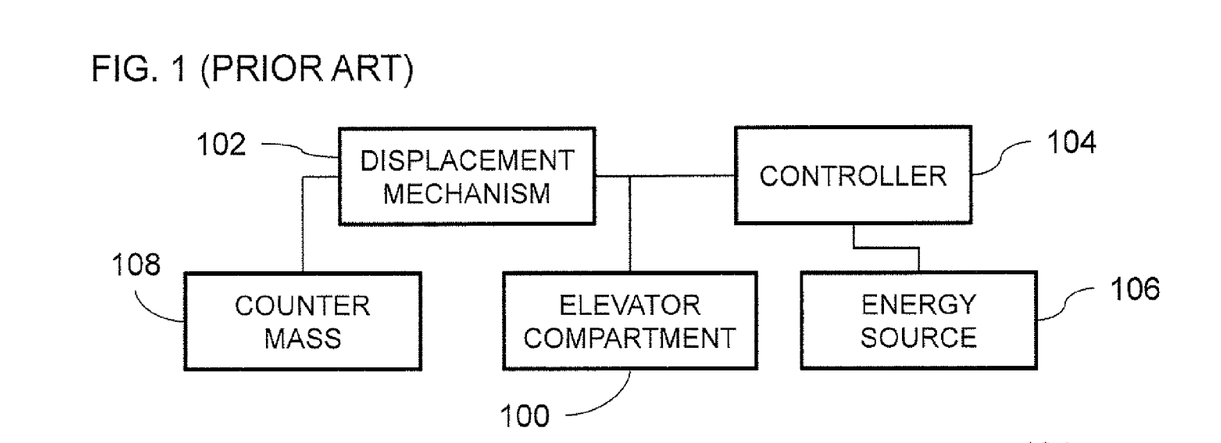
FIG. 1 is a generic block diagram of the main components of a typical conventional elevator.

By way of introduction, FIG. 1 shows in general terms a conventional elevator system. In each case, an elevator compartment 100 is displaced between floors by a displacement mechanism 102 which is selectively actuated by a controller 104 using energy from an energy source 106. In many cases, energy requirements are reduced by use of a counterweight 108 which travels in a direction opposite to motion of the elevator compartment, thereby reducing the work that needs to be performed by displacement mechanism 102. This schematic representation is clearly a high-level overview, and omits many details and subsystems, such as: braking arrangements; failsafe precautions; sensors for sensing correct alignment of the elevator compartment at each floor; and mechanisms for opening and closing internal and external elevator compartment doors. Some or all of such features may be essential to operation of the elevator, but are omitted here for simplicity since they do not relate directly to the aspects of the drive system addressed by the present invention. Furthermore, with regard to implementation of an elevator for Sabbath-observant Jews, acceptable technological solutions for the aforementioned additional features have previously been proposed, and are included in available commercially products.

The invention relates primarily, although not exclusively, to systems in which the principle energy source is electrical, provided by connection to an available power grid or in some cases by connection to a local electrical generator. Alternative implementations, for example, powered by a mechanical output from an internal combustion engine, also fall within the scope of the present invention. For simplicity of presentation, many of the drawings described below omit graphic representation of the principle energy source, which should be understood to be present in all cases.

Conventional elevator systems typically employ either an electric motor or a hydraulic cylinder as the driving component of displacement mechanism 102. As a first step towards avoiding the aforementioned variation in electric current as a function of the weight of the passengers, the present invention avoids use of an electric motor-based displacement mechanism. A subset of conventional elevator systems employing a hydraulic cylinder-based drive system is represented schematically in FIG. 3. Certain alternative displacement mechanisms which are considered to be novel in their own right will be described below with reference to FIGS. 9-12.

Figure 3:
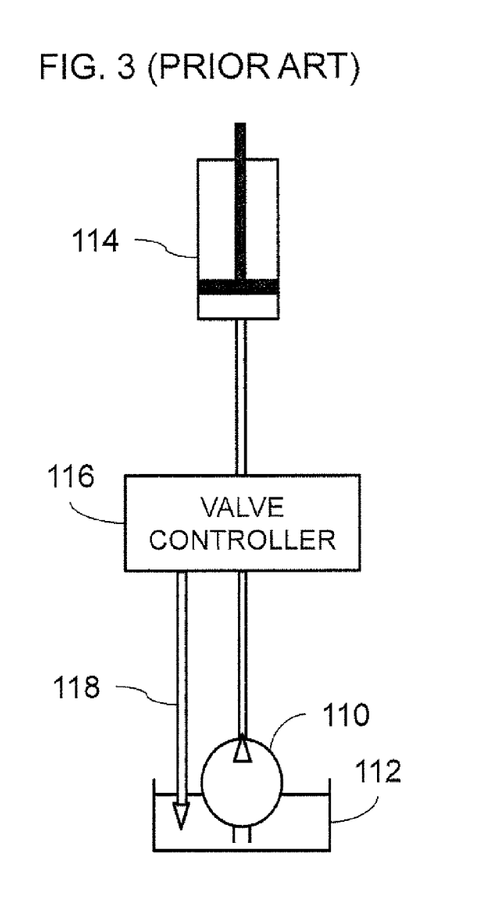
FIG. 3 is a schematic illustration of a conventional hydraulic cylinder-based elevator.

Referring to the hydraulic elevator of FIG. 3, there is shown a pump 110 driving hydraulic fluid (oil) under pressure from a reservoir 112 to a hydraulic cylinder 114 to lift an elevator compartment (not shown). Control of the motion is effected primarily by a valve controller 116, with included valves, which selectively connects the pump output to the cylinder for upward motion of the elevator compartment and allows draining of fluid from the cylinder (driven by the weight of the elevator compartment) via drainage line 118 for downward motion.

It should be noted that the subdivision of the elevator components between the displacement mechanism and the controller is not always so clear, and in some cases, the definition of what is considered a "control" component and what is considered a "displacement mechanism" component may not reflect the subdivision into physical components and may be somewhat arbitrary. For example, in the elevator of FIG. 3, the "displacement mechanism" may reasonably be defined to include pump 110 and cylinder 114, together with the valves of valve controller 112, whereas the "controller" may be defined only as the control logic which operates those valves.

Figure 2:
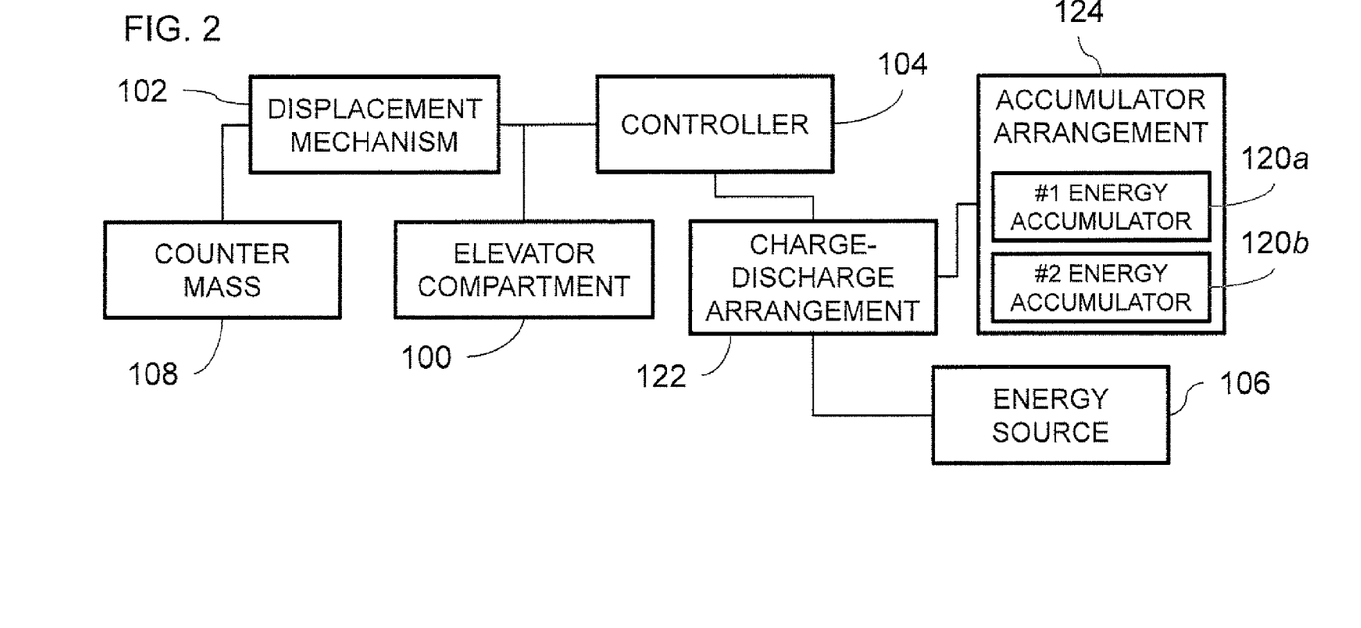
FIG. 2 is a general block diagram of an elevator with a drive system according to the teachings of certain embodiments of the present invention.

Turning now to FIG. 2, in general terms, a Sabbath elevator drive system according to certain preferred embodiments of the present invention employs at least one energy accumulator 120*a* configured to store a quantity of potential energy in a non-electric form, and a charge/discharge arrangement 122 associated with energy accumulator 120*a*, elevator displacement mechanism 102 and energy source 106. Charge/discharge arrangement 122 is configured to selectively assume:

a first state in which energy accumulator 120*a* charges with energy derived from energy source 106 so as to store a quantity of energy while being isolated from elevator displacement mechanism 102, and a second state in which energy accumulator 120*a* is isolated from energy source 106 and is connected to elevator displacement mechanism 102 to provide energy for moving elevator compartment 100 between floors.

In this context, the word "isolated" is used to refer to a state in which energy accumulator does not receive or supply stored energy from/to the device in question.

At this stage, it will already be clear that the present invention provides an elegant solution to the aforementioned problem of drawing variable power/current from a power source during operation of a Sabbath elevator. Specifically, by storing a predefined amount of energy in an energy accumulator in a non-electric form and then operating the elevator displacement mechanism using that stored energy while the accumulator is isolated from the power supply, the load on the elevator cannot directly affect the power drawn from the power source. In certain preferred implementations where energy stored in the accumulator is dissipated to an equal extent during each motion cycle (as will be exemplified below), the load on the elevator does not even indirectly affect the power drawn from the power supply during recharging of the accumulator. This and other advantages of preferred implementations of the present invention will be better understood in view of the remainder of the description below.

Referring further to FIG. 2, depending upon the time required to recharge the energy accumulator and the performance requirements for the system, it may be advantageous to include two or more energy accumulators 120*a* and 120*b* as part of an accumulator arrangement 124. In this case, charge/discharge arrangement 122 is preferably configured to operate in an alternating mode, charging second energy accumulator 120*b* while first energy accumulator 120*a* is connected to elevator displacement mechanism 102, and connecting second energy accumulator 120*b* to elevator displacement mechanism 102 while first energy accumulator 120*a* is charging. This arrangement allows the waiting time between drive cycles to be reduced or eliminated.

In certain alternative embodiments, an electrically powered device responsible for charging the energy accumulator operates intermittently, only during periods that the elevator compartment is not in motion, thereby ensuring that any variation in loading of the elevator compartment cannot affect the power drawn by the electrically powered device. This option works well with the normal operation of a Sabbath elevator according to which the elevator compartment has a predefined waiting time at each stopping location, and often has a more extended waiting time at a "home" position, such as at the entrance level of a building, providing ample time for energy storage between cycles.

Figure 4:
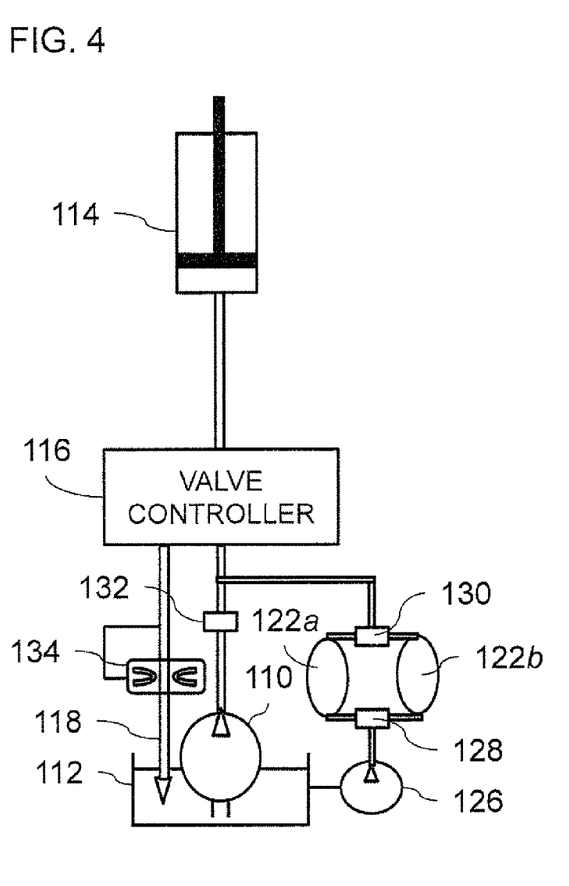
FIG. 4 is a schematic illustration of an elevator of the type shown in FIG. 3 with a drive system according to the teachings of an embodiment of the present invention.

Referring now to the non-limiting exemplary implementation of FIG. 4, this illustrates a hydraulic implementation of the present invention. For hydraulic actuator systems, each energy accumulator 122*a*, 122*b* is preferably implemented as a hydraulic accumulator which serves as a buffer, allowing a predefined quantity of hydraulic liquid to be stored at elevated pressure and then releasing the liquid to power the displacement mechanism. Hydraulic accumulators are well known, and are readily available from commercial sources of hydraulic equipment. Hydraulic accumulators typically operate by use of a pneumatic and/or mechanical spring against which a diaphragm or piston is pressed as the accumulator is filled.

Typical commercially available hydraulic elevators operate at pressures in the range of about 20-50 bar. In certain embodiments of the present invention, such conventional systems are adapted with minimal modification to be supplied by the hydraulic accumulator(s) of the present invention instead of directly by the pump. According to certain alternative preferred embodiments of the present invention, the size of the required hydraulic accumulators for implementing the present invention can advantageously be reduced by working at relatively higher working pressures and using a correspondingly lower volume of hydraulic fluid. Thus, according to certain particularly preferred embodiments of the present invention, the working pressure of the hydraulic system is in the range of about 60-120 bar, and most preferably in the range of about 70-100 bar.

It will be noted that the fully-charged state of the accumulators requires a pressure which is considerably above the working pressure applied to hydraulic cylinder 114 in order to ensure that the accumulator delivers the required working pressure even towards the end of its design output. The pressure is stepped-down to a substantially constant required working pressure by a pressure-limiting regulator valve, as is known in the art. In order to provide sufficient pressure for fully charging the accumulator, in certain particularly preferred cases, it is desirable to provide a dedicated charging pump 126 as part of the charge/discharge arrangement, in addition to the primary pump 110 used for "weekday" operation. In alternative implementations, a single pump of suitable design parameters may be used for both the charging function of the present invention and direct operation when in the weekday mode.

Figure 5A:
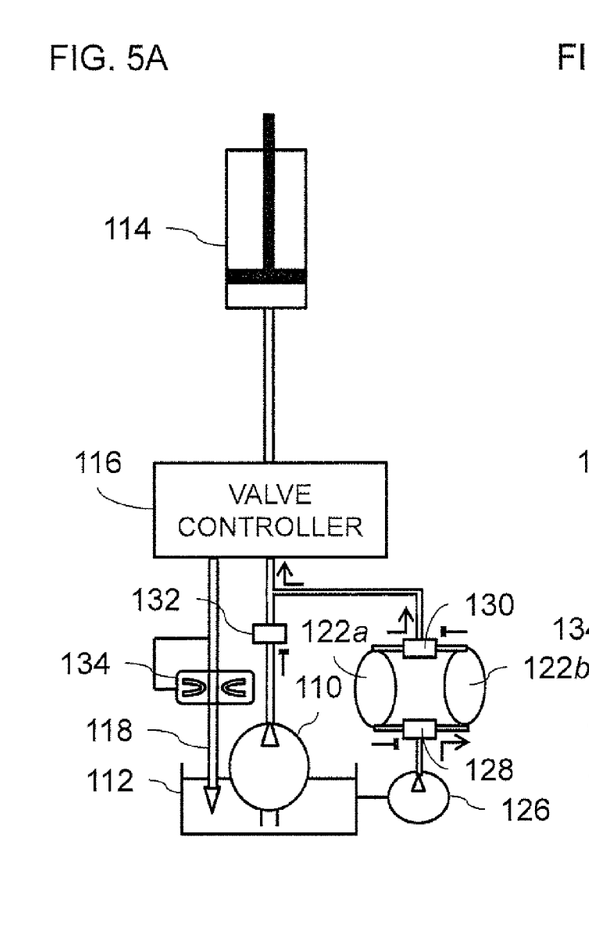
FIGS. 5A and 5B are views similar to FIG. 4 illustrating the states of various control valves while the drive system is in a first state and a second state, respectively.

Implementation of the charge/discharge arrangement according to this embodiment is primarily through selective operation of a set of hydraulic flow valves 128 and 130 by suitable control circuitry (not shown) to switch between different states of operation. The two primary states of the system are illustrated schematically in FIGS. 5A and 5B. In FIG. 5A, valve 128 is open to accumulator 122*b* and closed to accumulator 122a, while valve 130 is open to accumulator 122a and closed to accumulator 122b. In this state, pressure from accumulator 122a is supplied via valve controller 116 to cylinder 114 to operate the elevator while accumulator 122a is isolated from charging pump 126. At the same time, charging pump is connected to accumulator 122b so as to charge it with pressurized hydraulic liquid ready for the next stage of operation.

Figure 5B:
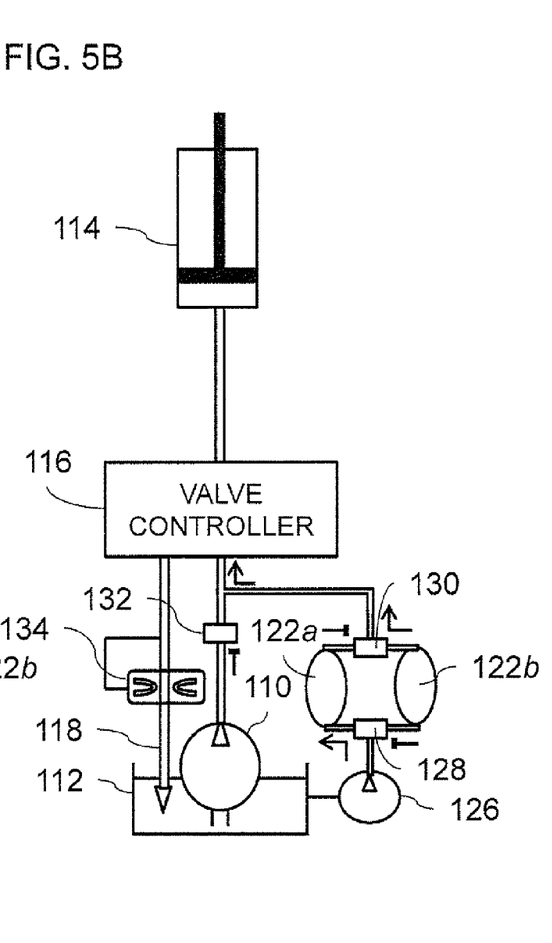

FIG. 5B shows the subsequent stage of operation, in a reversed state, in which valve 128 is open to accumulator 122a and closed to accumulator 122b, while valve 130 is open to accumulator 122b and closed to accumulator 122a. In this state, pressure from accumulator 122b is supplied via valve controller 116 to cylinder 114 to operate the elevator while accumulator 122b is isolated from charging pump 126. At the same time, charging pump is connected to accumulator 122a so as to charge it with pressurized hydraulic liquid ready for subsequent use.

Preferably, an additional valve 132 seals the weekday-mode flow path from pump 110 to ensure that the flow-path from pump 110 does not play any part in the flow regime in Sabbath mode.

Also illustrated here schematically is a pressure-compensated flow regulator 134 deployed in drainage flow path 118 to render a speed of motion of the elevator compartment substantially independent of a load within the elevator compartment. Pressure-compensated flow regulator 134 may be implemented using commercially available pressure-responsive valves where the input-side fluid pressure is routed so as to act on a diaphragm so as to restrict the available fluid passageway, effectively providing feedback to compensate for the effect of fluid pressure on the flow rate. The valve regulator can be selected to provide constant flow over a given range of operating pressures, or even to offer negative correlation in which the rate of motion of the elevator decreases in response to increased load, thereby preventing any increase to elevator speed due to entry of an additional passenger to the elevator compartment. In certain particularly preferred implementations, the elevator speed is unchanged by entry of an additional passenger.

Most preferably, two or more such pressure-compensated flow regulators 134 defining different flow rates may be connected in parallel and selectively opened by corresponding valves operated by valve controller 116 in order to provide two or more elevator speeds which are used sequentially to provide gentler starting and stopping of the elevator motion.

In the schematic illustration shown here, the hydraulic accumulators and charge/discharge arrangement are implemented as an add-on to the conventional system of FIG. 3, and may in fact be considered a substitute pressure supply for valve controller 116, without requiring significant modification of the standard controller. Such an implementation particularly lends itself to retrofit installation of a Sabbath elevator drive system according to the present invention. It should be appreciated, however, that it may be preferable in some cases to integrate the charge/discharge arrangement with other components of the controller, thereby possibly achieving economy with regard to the number of valves required and/or integrating and better coordinating various functions of the control system with the Sabbath operation mode. For example, the aforementioned option of providing two or more pressure-compensated flow regulators selectively opened and closed to provide a gentle start and stop to the motion typically requires some degree of integration of the control of those valves with the controller.

The volume of the hydraulic accumulators is preferably chosen to allow the elevator to complete a given unit of motion without interruption. Minimally, this is typically the range of motion from one floor up to the next. Climbing floor-by-floor with a stop at each level is typically an acceptable mode of operation for an automated Sabbath elevator. In many cases, the accumulator capacity is chosen to be sufficient to allow travel over a range of multiple floors without recharging, allowing for a range of alternative algorithms for the number and sequence of stops during ascent and descent. In some cases, the accumulator may store sufficient energy to accomplish the entire range of motion (bottom level to uppermost level) through a single charged. In this case, the elevator may optionally be employed in a mode in which it climbs in a single movement from bottom to top and then descends floor-by-floor, automatically stopping at each level, typically through operation of valves controlling the descent under the force of gravity, while the accumulator is recharged.

Although return of the cylinder piston under the force of gravity is sufficient for many implementations, certain implementations may employ spring-biased cylinder to return the piston to a retracted position. In an alternative implementation, a bidirectional hydraulic cylinder which is positively driven in both extension and retraction motions by fluid pressure may be used. A flow layout similar to that of FIG. 9, below, is suitable for driving such a bidirectional cylinder.

Figure 6:
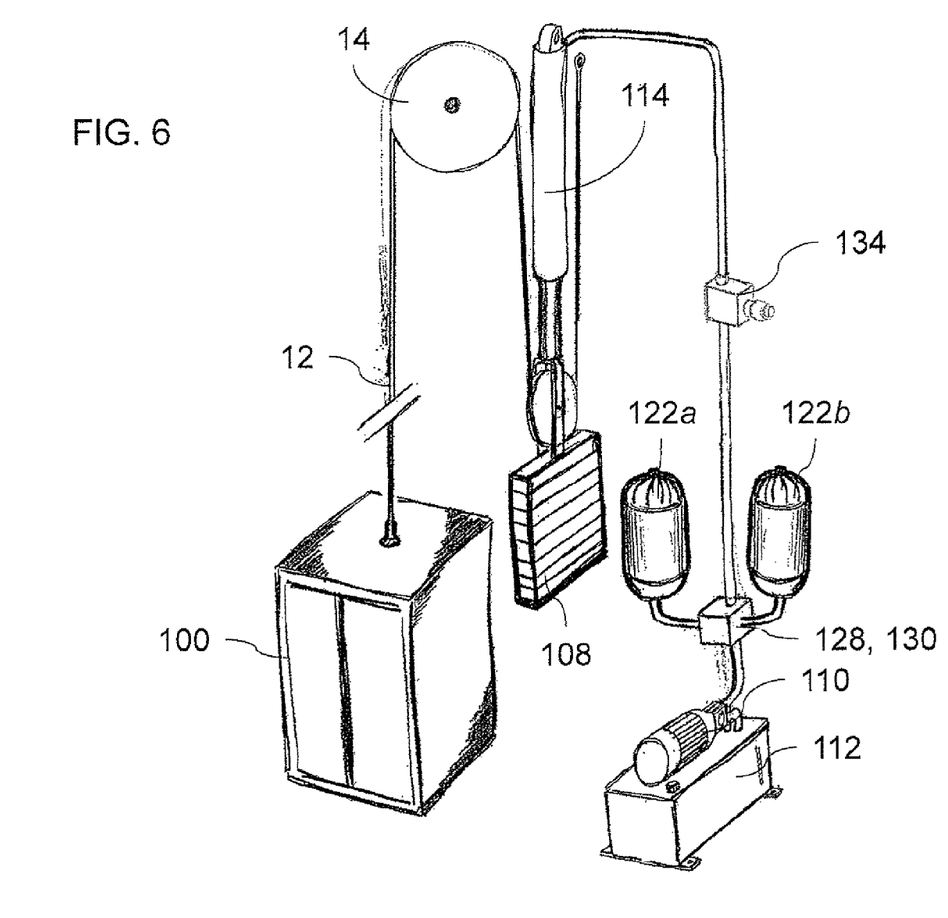
FIG. 6 is a schematic isometric view of an implementation of a hydraulic cylinder-based elevator with a drive system according to the teachings of an embodiment of the present invention.

Turning now to FIG. 6, this illustrates schematically an implementation of the present invention which is functionally substantially equivalent to that of FIG. 4, with equivalent components labeled similarly. The embodiment of FIG. 6 differs from that of FIG. 4 primarily in that it employs a single pump 110, and in that it employs a downward-acting hydraulic cylinder 114 integrated with a cable arrangement (cable 12 and upper pulley 14) and counterweight 108 to reduce the energy usage of the system. This implementation also employs a single flow path for both the drive stroke and return stroke fluid flow to/from the cylinder.

Figure 7:
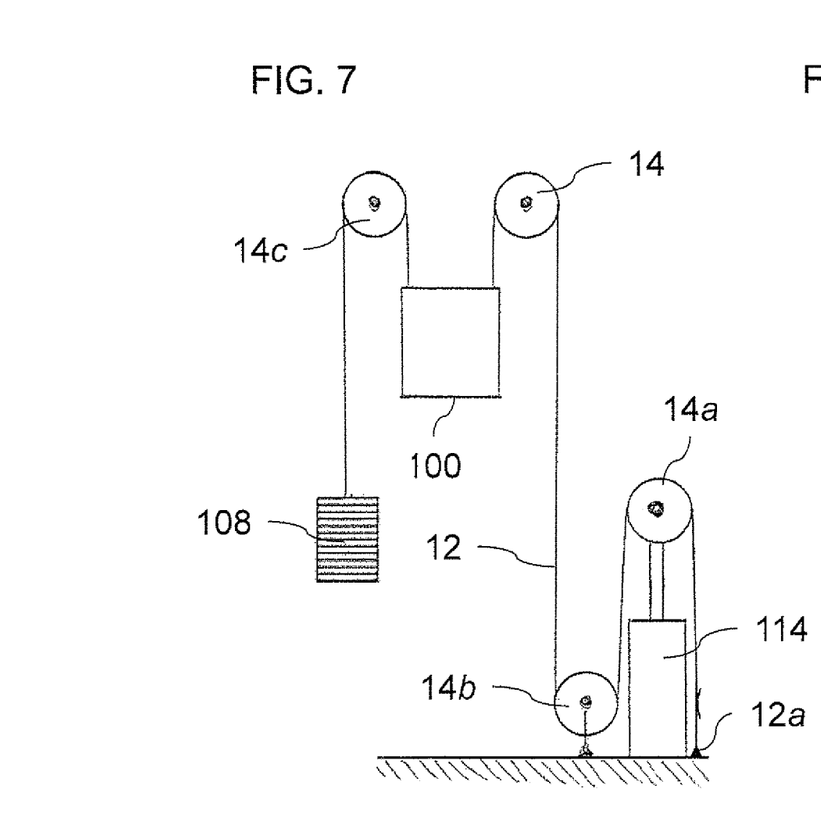
FIG. 7 is a schematic diagram illustrating a motion-multiplying arrangement for use with a hydraulic cylinder in certain implementations of the present invention.
Figure 8:
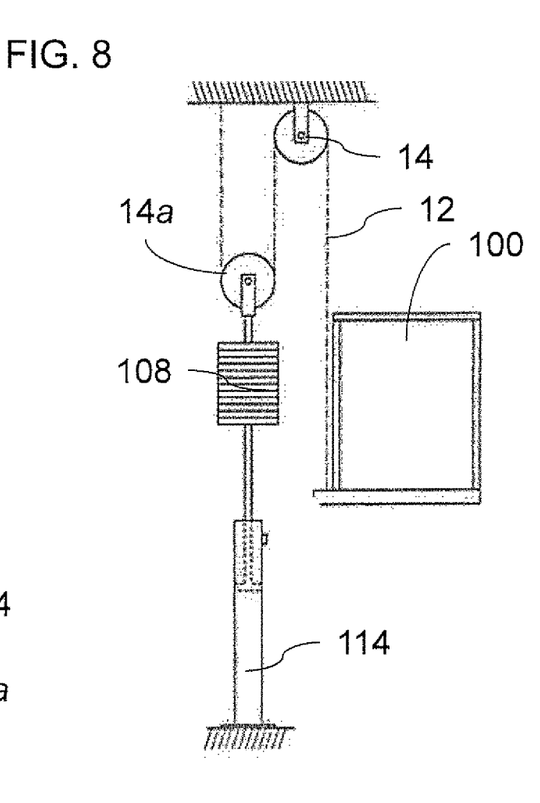
FIG. 8 is a schematic diagram illustrating deployment of a hydraulic cylinder in a pull-ram configuration for use in certain implementations of the present invention.

In certain cases, it is preferable to employ a hydraulic actuator arrangement which requires relatively little fluid for a given displacement and/or which allow use of relatively compact cylinders. FIGS. 7 and 8 illustrate two actuator configurations which are considered advantageous for use in elevator drive systems according to the present invention.

FIG. 7 illustrates an elevator displacement mechanism that includes a motion-multiplying arrangement (also known as a mechanical amplifier) linking hydraulic cylinder 114 to elevator compartment 100. Specifically, the motion-multiplying arrangement employs a cable 12 anchored at one end 12a and extending around a pulley 14a which is located on the end of the hydraulic cylinder drive rod, and back around an anchored pulley 14b before passing up and around upper pulley 14. As a result of this arrangement, a given change in an extent of extension of hydraulic cylinder 114 generates twice as much displacement of the elevator compartment. Clearly, by use of additional stages of pulleys, larger multiple ratios can also be achieved. In certain cases, motion-multiplying arrangements provide non-integer multiples, and may in some cases generate non-linear motion amplification. (Parenthetically, it is noted that the arrangement of FIG. 6 also exhibits this 1:2 drive ratio.) The motion-multiplying arrangement facilitates the use of a shorter cylinder than would otherwise be required, and also reduces the required volume of hydraulic fluid compared to a hydraulic system with a 1:1 drive ratio. Optionally, as illustrated in the particularly preferred implementation shown here, the elevator further employs a counterweight 108 supported by a cable passing over an additional pulley 14c so as to reduce the power required to drive the elevator compartment 100.

Turning now to FIG. 8, this illustrates a further optional feature according to which the elevator displacement mechanism includes a linkage configured to raise the elevator compartment on shortening of the hydraulic cylinder. In the case illustrated here, the cylinder draws downwards a pulley 14a at the end of the cylinder drive rod (again generating a 1:2 drive ratio), thereby drawing down part of cable 12 to raise the elevator compartment. Use of hydraulic cylinder 114 in a "pull" mode greatly reduces the requirements for rigidity of the drive rod, thereby facilitating use of a smaller diameter piston and corresponding cylinder, and hence further reducing the hydraulic fluid volume required for a given displacement.

As in all implementations of the invention, the elevator system includes numerous components not detailed in these schematic drawings, including an electronic controller including a processor programmed to operate the various components of the drive system, various sensors for determining the position of the elevator compartment relative to the predefined stopping positions of the elevator, brakes for stopping the elevator and locking it in position, actuators for opening and closing the doors, and numerous other components which are generally standard in commercially available elevators and/or "Shabbat elevators". The aforementioned features are either standard or are readily adapted by a person having ordinary skill in the art to perform the functions described herein, and will therefore not be described here in detail.

Figure 9:
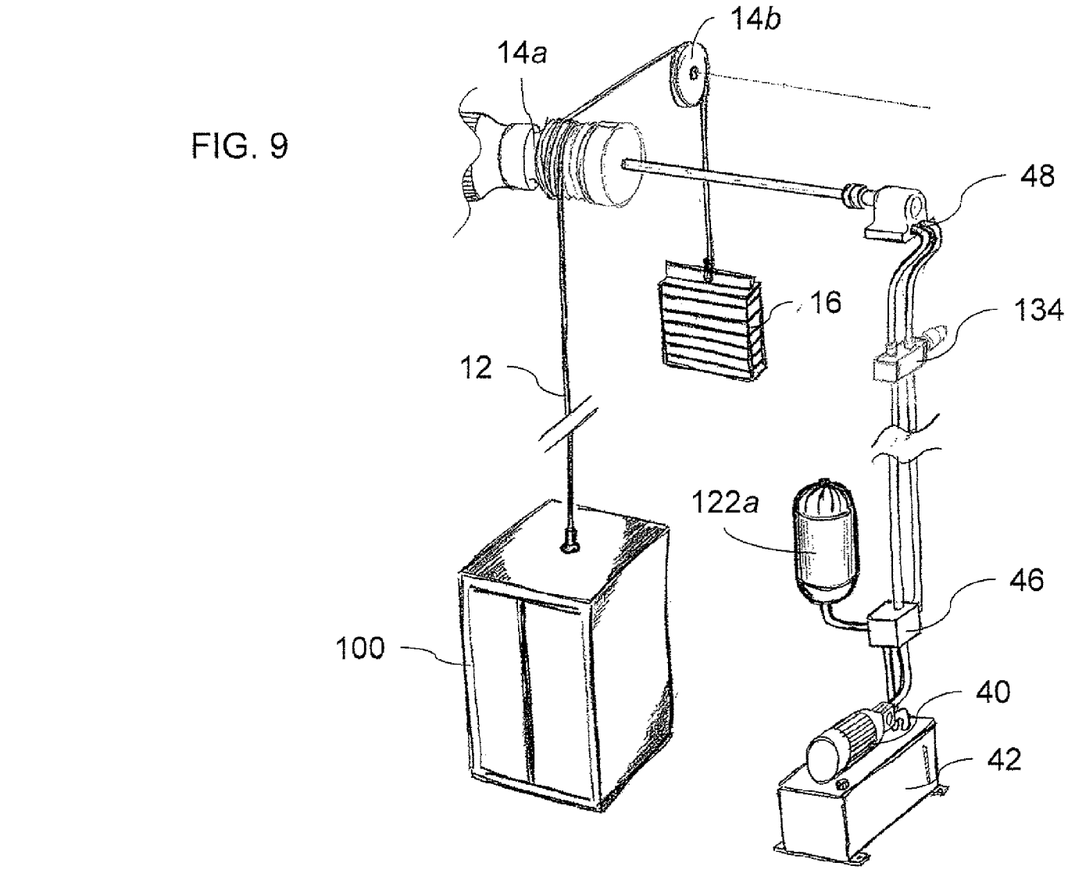
FIG. 9 is a schematic isometric representation of a Sabbath elevator with a drive system constructed and operative according to an embodiment of the present invention, in which potential energy is stored in a hydraulic accumulator which drives a hydraulic motor.

Turning now to FIG. 9, there is illustrated schematically an alternative hydraulic embodiment in which the hydraulic system includes a hydraulic motor 48. In the example illustrated here, a valve arrangement 46 controls the supply of hydraulic fluid in one direction or the other to a bidirectional hydraulic motor 48, linked to the main elevator pulley 14a. This allows the elevator to be driven directly in either direction using energy stored in accumulator 122a. Hydraulic fluid exiting motor 48 is routed via valve arrangement 46 back to reservoir 42. Accumulator 122a is then recharged during waiting periods of the elevator by supply of additional fluid from reservoir 42 by pump 40. Although shown here with a single accumulator, an arrangement alternately employing two or more accumulators may also be used. For weekday operation, valve arrangement 46 may connect pump 40 directly to the appropriate inlet of motor 48. Alternatively, an electric motor (not shown) may be combined on the drive axle of pulley 14a for weekday operation, typically via a suitable clutch arrangement, all as will be clear to one ordinarily skilled in the art.

In alternative embodiments of the present invention, the various hydraulic implementations described above are implemented using a pneumatic (gas pressure) system, with appropriate changes to design where needed, as will be clear to a person having ordinary skill in the art.

Figure 10:
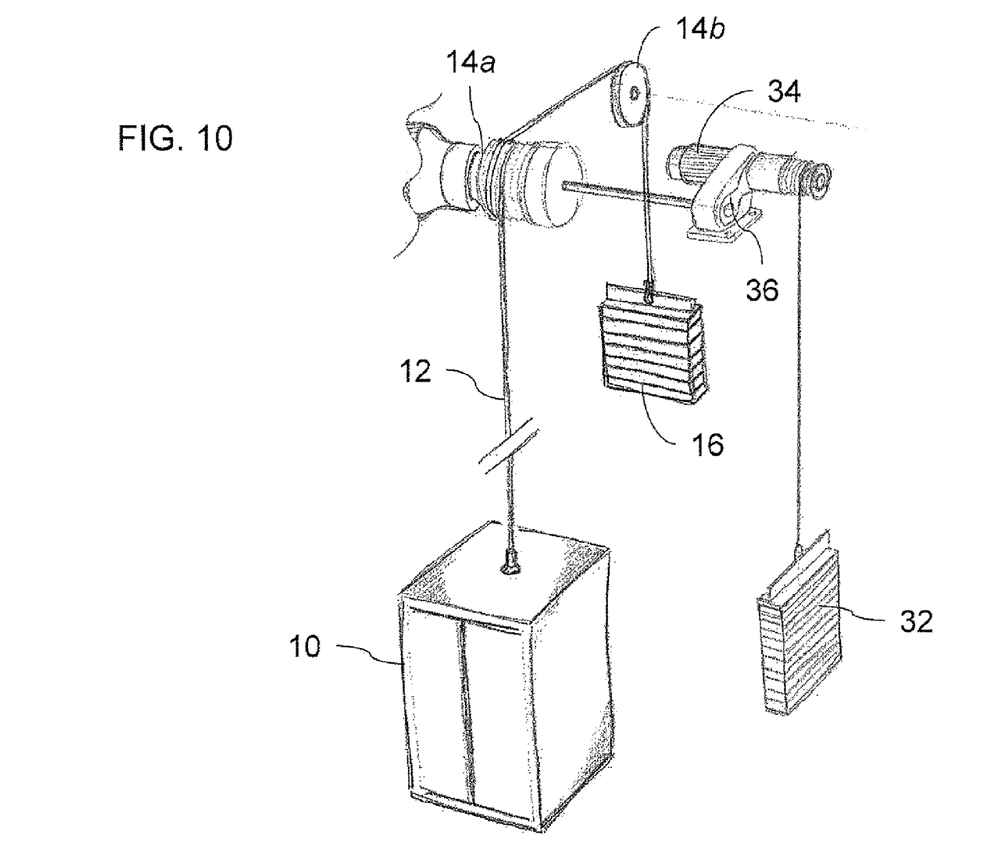
FIG. 10 is a schematic isometric representation of a Sabbath elevator with a drive system constructed and operative according to an embodiment of the present invention, in which potential energy is stored by raising a weight which operates a drive mechanism.
Figure 11:
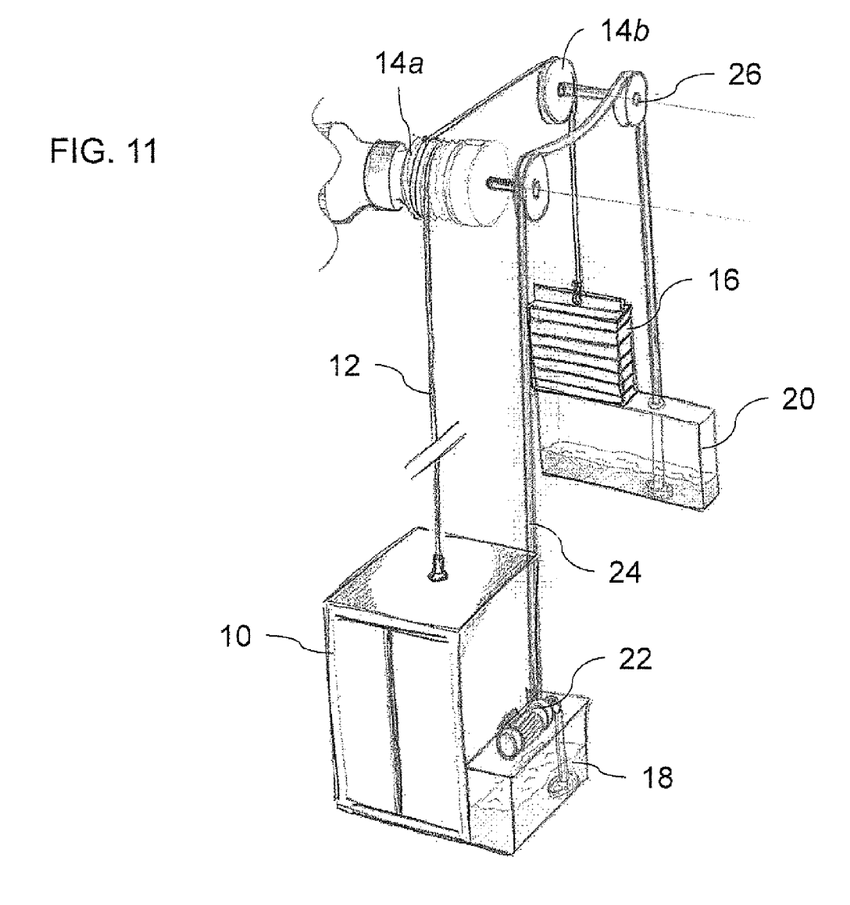
FIG. 11 is a schematic isometric representation of a Sabbath elevator with a drive system constructed and operative according to an embodiment of the present invention, in which potential energy is stored by fluid mass transfer between the elevator compartment and a counterweight.
Figure 12:
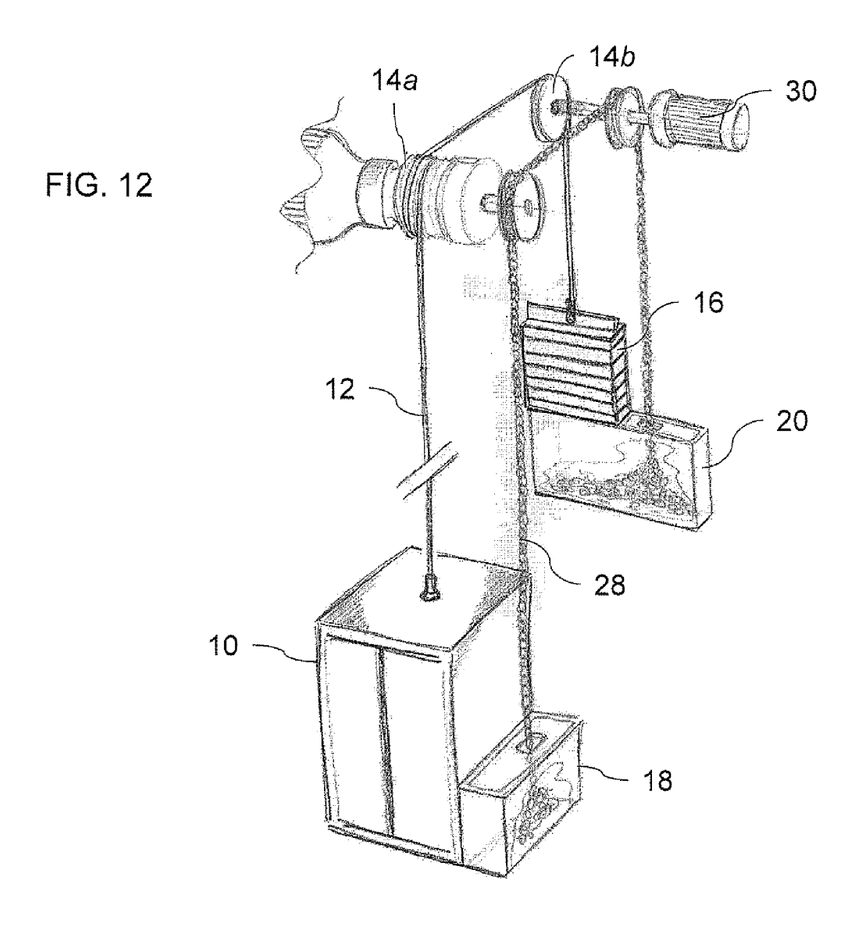
FIG. 12 is a schematic isometric representation of a Sabbath elevator with a drive system constructed and operative according to an embodiment of the present invention, in which potential energy is stored by solid mass transfer between the elevator compartment and a counterweight.

Turning now to a further set of implementations to be exemplified with reference to FIGS. 10-12, these relate to implementations in which the basic displacement mechanism of the elevator, at least during operation in the Sabbath mode, is modified to be driven by gravitational force. In each of these cases, the energy accumulator stores energy by raising a mass against the force of gravity, and in some cases, becomes an integral part of the displacement mechanism.

Referring first to FIG. 10, as with various other exemplary embodiments of the present invention illustrated herein, this embodiment relates to an elevator in which an elevator compartment 10 is suspended on one or more cables 12 for vertical motion within an elevator shaft (omitted for clarity). Cable 12 passes over one or more upper pulley 14, 14a and/or 14b and is connected to a counterweight 16. An additional weight 32 is raised by a motorized winch 34 and then provides driving power as it descends under gravity via a reversible gear 36 linked to main elevator pulley 14a. The magnitude of the weight and the drive ratio of gear 36 are chosen to provide sufficient driving force to move elevator in either direction and under maximum/minimum load conditions. Depending on the gear ratio and the range of motion, a single "charging" of the potential energy storage may be sufficient to move the elevator through its entire range of motion, or an interim recharging may be required. Accumulation of potential energy is achieved by raising the additional weight 32, and motion in each direction is then controlled by a speed limiting mechanism and braking, as above. When reaching one end of the elevator's motion, the direction of reversible gear 36 is reversed.

Turning now to FIGS. 11 and 12, these illustrate a further conceptual approach according to which the charge/discharge transfers a mass directly between the elevator compartment and a counterweight assembly.

Referring specifically to FIG. 11, this shows an exemplary embodiment of the invention in which a quantity of liquid, typically water, is transferred between a first container 18 associated with elevator compartment 10 and a second container 20 associated with counterweight 16, thereby alternately providing gravitational potential energy to drive downwards the elevator compartment and the counterweight. Transfer of the liquid is achieved by one or more electric pump 22 pumping the liquid along a hose 24. In the non-limiting option illustrated here, hose 24 is deployed directly between containers 18 and 20 over guide pulleys 26. In an alternative implementation (not shown), separate pumps and recoiling hoses may be used to pump liquid from a fixed reservoir to and from the containers.

In a typical elevator, counterweight 16 is designed to balance elevator compartment 10 when holding roughly half of the maximum permitted load. In such a case, the mass of liquid to be transferred between the containers should be somewhat more than half the maximum permitted load. This ensures that, when the liquid is transferred to first container 18, elevator compartment 10 will descend even if empty and, when the liquid is transferred to second container 20, counterweight 16 will descend even if the elevator compartment is fully loaded.

Once the required potential energy has been stored by pumping the liquid to the required container, control of the subsequent motion of the elevator becomes purely a function of braking at the appropriate stopping positions during the gravity-powered descent of the heavier side. Most preferably, a speed limiting mechanism (not shown) is deployed on the cable in order to render the speed of descent independent of the weight differential between the two sides. The speed limiting mechanism may be implemented using various mechanical or hydraulic arrangements. Examples include, but are not limited to: cable braking arrangements designed to be responsive to tension in the cable; and hydraulic damping based on pressure-regulating control valves, such as were discussed above.

Once the elevator reaches one extreme of its motion, pump(s) 22 are operated to transfer the liquid to the other container ready for the opposite motion of the elevator.

FIG. 12 illustrates an alternative embodiment which is fully analogous to that of FIG. 11, but replaces the pump and liquid with a chain 28 and a motorized chain drive 30. The dynamics of this arrangement are subtly different from those of the liquid mass transfer in that the weight of the portion of the chain hanging from the pulleys does not contribute to the weight of either side of the elevator, and that this hanging length varies with the vertical position of each side. Other than this difference, the structure and operation of this embodiment is fully analogous to that of FIG. 11.

It will be noted that implementations similar to FIGS. 11 and 12 may be implemented with a range of other types of mass and corresponding mass-transfer arrangements, including but not limited to, various types of conveyor systems. Variant implementations may have only one container mounted so as to move with either the elevator compartment or the counterweight, or connected thereto by a system of pulleys or other linkage. Direct mass transfer between containers mechanically linked to each of the elevator compartment and the counterweight typically provides advantages of reducing the total mass to be transferred.

Although the various embodiments illustrated herein have all referred to applications in the context of Sabbath elevators, the principles of the invention may be used to advantage in other contexts in which a load is to be transported in a manner which renders it permissible, or involving less stringent prohibitions, on the Sabbath. Other examples include, but are not limited to, operation of an escalator and operation of a Sabbath vehicle, such as for security patrols or a mobility vehicle for elderly or disabled people. Where continuous operation is required, two or more energy accumulators may be used alternately, with one being charged while the other is providing the required motive power, as already exemplified above.

Figure 13:
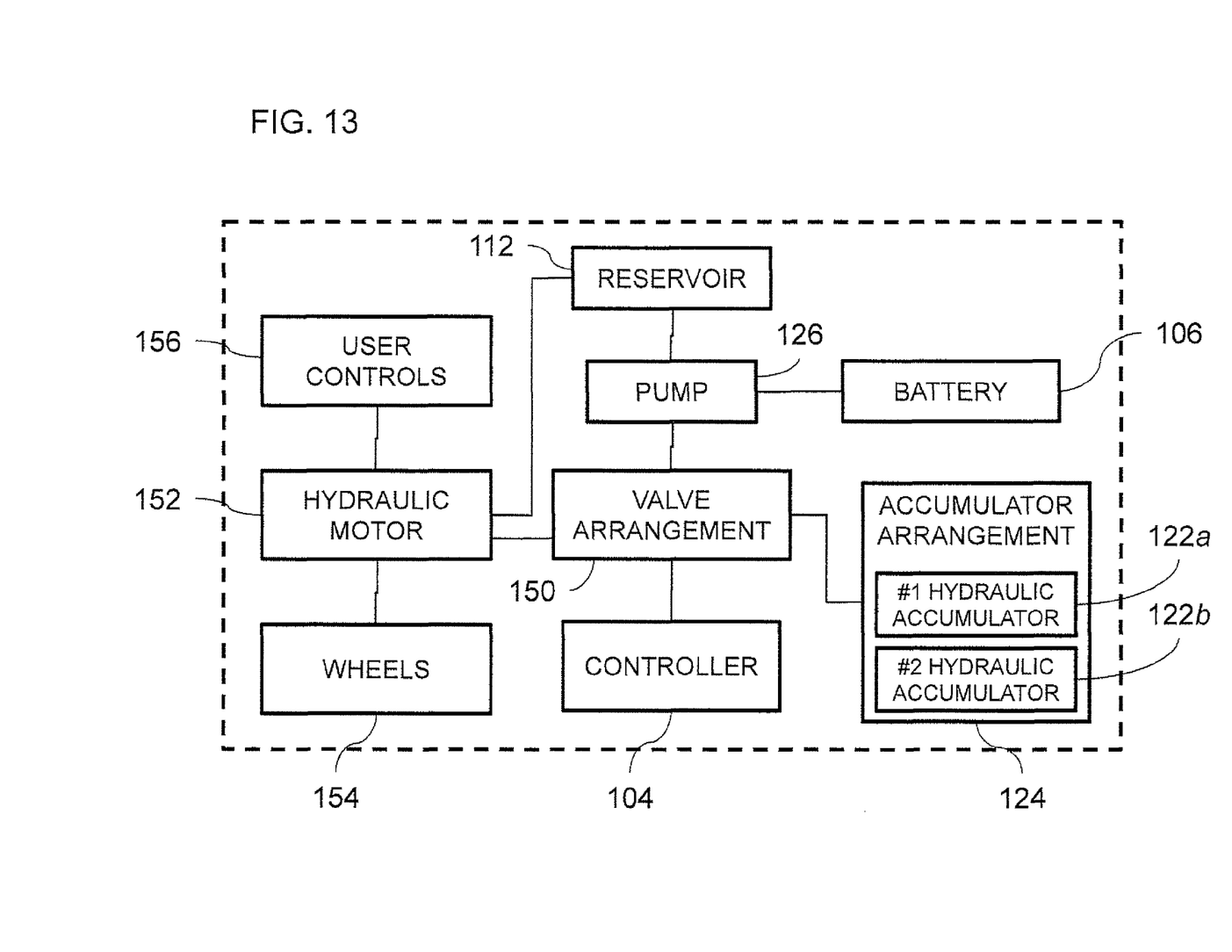
FIG. 13 is a schematic representation of an embodiment of a vehicle employing a drive system according to the teachings of the present invention.

By way of one non-limiting schematic example, FIG. 13 shows a vehicle, such as a mobility vehicle, constructed and operative according to certain preferred implementations of the present invention, in which a power source (battery) 106 drives a pump 126 to alternately charge hydraulic accumulators 122a and 122b, which are then alternately connected via valve arrangement 150 to drive a small hydraulic motor 152 which powers the wheels 154 of the vehicle. The delivery of pressurized fluid via valve arrangement 150 to hydraulic motor 152 is controlled by various user controls 156, such as an accelerator pedal. The fluid then drains back to reservoir 112. In order to avoid influence of the manner of driving on the amount of power drawn from the battery, switching between accumulators may be performed in a timed manner and/or any remaining stored pressure may be released from the used accumulator before the recharge cycle begins.

Optionally, in certain cases, the power source and pump may be located off-vehicle at a recharge station.

It will be appreciated that the above descriptions are intended only to serve as examples, and that many other embodiments are possible within the scope of the present invention as defined in the appended claims.

What is claimed is:

1. A Sabbath elevator drive system for driving motion of an elevator compartment based on energy from an energy source, the drive system comprising:
   (a) a displacement mechanism mechanically associated with the elevator compartment for moving the elevator compartment between floors;
   (b) an energy accumulator configured to receive, store and subsequently supply a quantity of energy that is input and output without flow of electrical current; and
   (c) a charge/discharge arrangement associated with said energy accumulator, said displacement mechanism and the energy source, said charge/discharge arrangement being configured to switch between:
      (i) a first state in which said energy accumulator charges with energy derived from the energy source so as to store a quantity of energy while not receiving energy from, or supplying energy to, said displacement mechanism, and
      (ii) a second state in which said energy accumulator does not receive energy from, or supply energy to, the energy source and is connected to said displacement mechanism to provide energy for moving the elevator compartment between floors.

2. The drive system of claim 1, wherein said energy accumulator is a first accumulator of an accumulator arrangement further comprising at least a second energy accumulator, and wherein said charge/discharge arrangement is configured to charge said second energy accumulator while said first energy accumulator is connected to said displacement mechanism, and subsequently to connect said second energy accumulator to said displacement mechanism.

3. The drive system of claim 1, wherein said energy accumulator is a hydraulic accumulator.

4. The drive system of claim 3, wherein said displacement mechanism comprises a hydraulic cylinder.

5. The drive system of claim 4, wherein said displacement mechanism further comprises a motion-multiplying arrangement linking said hydraulic cylinder to the elevator compartment and configured such that a given change in an extent of extension of said hydraulic cylinder generates a corresponding displacement of the elevator compartment greater than said given change.

6. The drive system of claim 4, wherein said displacement mechanism further comprises a linkage configured to raise the elevator compartment on shortening of said hydraulic cylinder.

7. The drive system of claim 3, wherein said charge/discharge arrangement comprises a hydraulic pump configured to raise a pressure within said hydraulic accumulator to a charged pressure of at least 60 bar.

8. The drive system of claim 3, wherein said displacement mechanism comprises a pressure-compensated flow regulator deployed to render a speed of motion of the elevator compartment substantially independent of a load within the elevator compartment.

9. The drive system of claim 3, wherein said displacement mechanism comprises a hydraulic motor.

10. The drive system of claim 9, further comprising an electric motor linked to a drive axle of the drive system such that movement of the elevator compartment can be driven alternatively by said hydraulic motor and by said electric motor.

11. The drive system of claim 1, wherein said energy accumulator is a pneumatic accumulator.

12. The drive system of claim 1, wherein said energy accumulator stores energy by raising a mass against the force of gravity.

13. The drive system of claim 12, wherein said mass is a quantity of liquid and wherein said charge/discharge arrangement includes a pump.

14. The drive system of claim 12, wherein said mass is a length of chain and wherein said charge/discharge arrangement includes a chain drive.

15. The drive system of claim 12, wherein said charge/discharge transfers at least part of said mass directly between the elevator compartment and a counterweight assembly.

16. A drive system for driving motion of a device based on energy from an energy source, the drive system comprising:
   (a) a displacement mechanism mechanically associated with the device for driving motion of the device;
   (b) an energy accumulator configured to receive, store and subsequently supply a quantity of energy that is input and output without flow of electrical current; and
   (c) a charge/discharge arrangement associated with said energy accumulator, said displacement mechanism and the energy source, said charge/discharge arrangement being configured to switch between:
      (i) a first state in which said energy accumulator charges with energy derived from the energy source so as to store a quantity of energy while not receiving energy from, or supplying energy to, said displacement mechanism, and
      (ii) a second state in which said energy accumulator does not receive energy from, or supply energy to, the energy source and is connected to said displacement mechanism to provide energy for driving motion of the device.

17. The drive system of claim 16, wherein said drive system is incorporated into an elevator system.

18. The drive system of claim 16, wherein said drive system is incorporated into an escalator.

19. The drive system of claim 16, wherein said drive system is incorporated into a vehicle.

* * * * *